(12) United States Patent
Park

(10) Patent No.: US 8,360,033 B2
(45) Date of Patent: Jan. 29, 2013

(54) LUBRICANT VENT STRUCTURE OF FUEL PUMP FOR VEHICLE

(75) Inventor: Changjun Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 380 days.

(21) Appl. No.: 12/868,358

(22) Filed: Aug. 25, 2010

(65) Prior Publication Data

US 2011/0048385 A1    Mar. 3, 2011

(30) Foreign Application Priority Data

Aug. 27, 2009 (KR) .................. 10-2009-0079629

(51) Int. Cl.
*F02M 37/04* (2006.01)
(52) U.S. Cl. .............. 123/509; 137/565.24; 137/565.22; 137/565.34; 123/514
(58) Field of Classification Search ............... 417/423.3, 417/306, 435; 123/509; 137/583–589
See application file for complete search history.

(56) References Cited

U.S. PATENT DOCUMENTS

| | | | | |
|---|---|---|---|---|
| 6,308,733 B2 * | 10/2001 | Murakoshi et al. | ...... | 137/565.34 |
| 6,401,751 B2 * | 6/2002 | Murakoshi et al. | ...... | 137/565.34 |
| 2005/0045159 A1 | 3/2005 | Honda et al. | | |
| 2012/0073684 A1 * | 3/2012 | Kim et al. | ................ | 137/565.24 |

FOREIGN PATENT DOCUMENTS

| | | |
|---|---|---|
| JP | 2005-69171 A | 3/2005 |
| KR | 10-0671357 B1 | 1/2007 |
| KR | 10-0774342 B1 | 11/2007 |
| KR | 10-2009-0049811 A | 5/2009 |

* cited by examiner

*Primary Examiner* — Stephen K Cronin
*Assistant Examiner* — Gonzalo Laguarda
(74) *Attorney, Agent, or Firm* — Morgan, Lewis & Bockius LLP

(57) ABSTRACT

A lubricant vent structure of a fuel pump for a vehicle, may include a mounting unit mounted to a pumping unit, a plurality of link units having a support link and a stopper restricting a rotatable range of the support link, wherein the plurality of link units is pivotally connected each other in a series by an elastic member respectively and the elastic member elastically supports the support link in the direction of the maximum rotatable range thereof, and a vent tube having an open end fixed to the last support link of the link units and communicating with a lubrication space of the pumping unit of the fuel pump, wherein the support link of the first link of the link units is pivotally fixed to the mounting unit of the fuel pump.

7 Claims, 6 Drawing Sheets

FIG.2
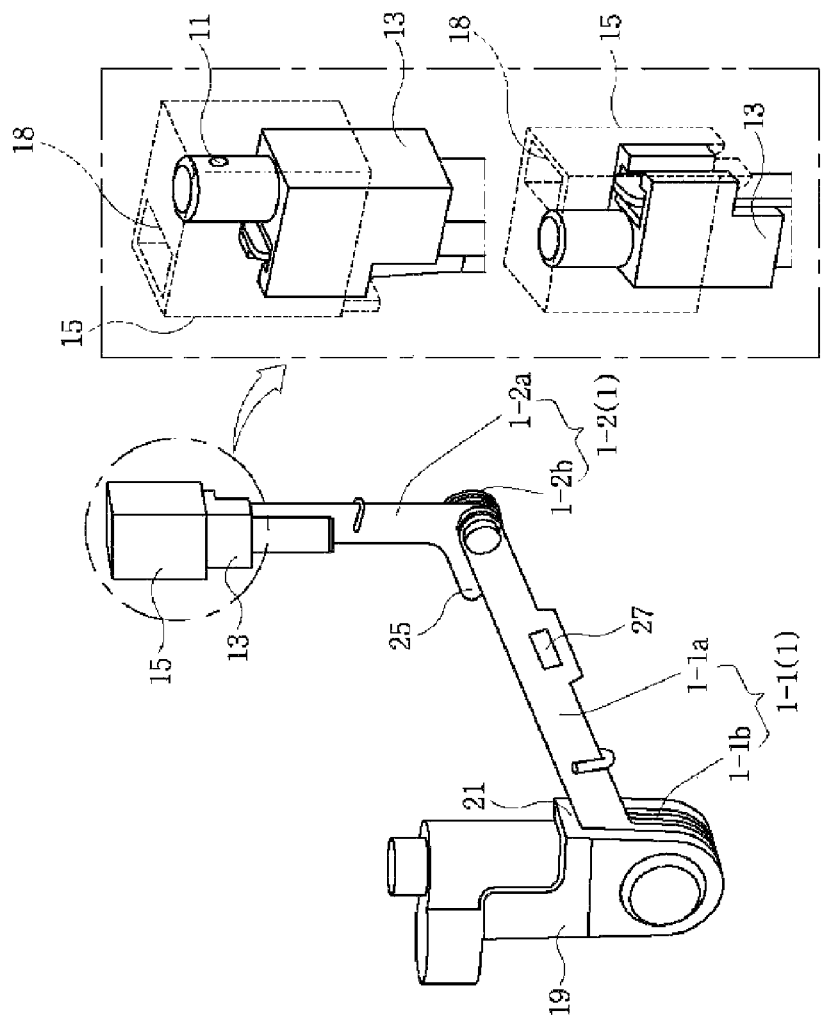
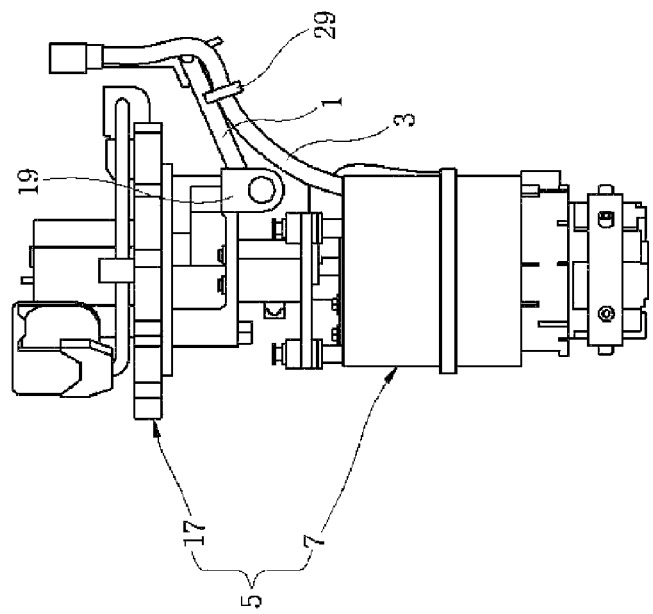

NOT SUNK AT REARWARD INCLINATION OF 30% WHEN FULLY FILLED (85% FILLED, 45L)

LUBRICANT VENT STRUCTURE OF FUEL PUMP FOR VEHICLE

CROSS-REFERENCE TO RELATED APPLICATIONS

The present application claims priority to Korean Patent Application Number 10-2009-0079629 filed Aug. 27, 2009, the entire contents of which application is incorporated herein for all purposes by this reference.

BACKGROUND OF THE INVENTION

1. Field of the Invention

The present invention relates to a fuel pump of a vehicle, in more detail, a technology for reducing noise of a fuel pump disposed in a fuel tank storing liquid-state LPG (Liquefied Petroleum Gas) and improving durability.

2. Description of Related Art

Vehicles using LPG as fuel are equipped with a fuel tank storing liquid-state LGP, and particularly, in LPI (Liquefied Petroleum Injection) vehicles, a fuel pump that pumps up liquid-state LPG itself and sending it to an injector is disposed in a fuel tank.

FIG. 1 shows an example when a fuel pump which is used in LPI vehicles is mounted in a fuel tank in the related art. A pumping unit 500 of the fuel pump is sunk in liquid-state LPG a mounting unit 504 that fixes the pumping unit 500 with respect to the fuel tank 502 and is connected with the outside of the fuel tank 502 is fixed to the fuel tank 502, and a vent tube 508 that is connected with a space through which lubricant for lubrication of pumping unit 500 flows, a vent channel 510 and a vent hole 506 of mounting unit 504 which are connected with vent tube 508 are provided.

Vent hole 506 opens the space, through which the lubricant flows is, to the inside of fuel tank 502 such that the internal pressure of fuel tank 502 is exerted, in order to manage changes in temperature and pressure due to operation of the fuel pump, in which liquid-state fuel should not flow into vent hole 506.

As exemplified in FIG. 1, however, when liquid fuel flows into vent hole 506, the lubricant and the liquid fuel are mixed and the fuel mixed with the liquid fuel is evaporated and removed with the evaporation of the liquid fuel, such that pumping unit 500 is worn by reduction of the lubricant and noise is generated from pumping unit 500, thereby reducing durability.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a lubricant vent structure of a fuel pump for a vehicle that prevents liquid fuel in a fuel tank from flowing into a vent hole by positioning the vent hole communicating with a space, through which lubricant flows, for lubricating a pumping unit of a fuel pump to the highest level of the fuel tank, and that can be easily mounted in the fuel tank.

In an aspect of the present invention, the lubricant vent structure of a fuel pump for a vehicle, may include a mounting unit mounted to a pumping unit, a plurality of link units having a support link and a stopper restricting a rotatable range of the support link, wherein the plurality of link units is pivotally connected each other in a series by an elastic member respectively and the elastic member elastically supports the support link in the direction of the maximum rotatable range thereof, and a vent tube having an open end fixed to the last support link of the link units and communicating with a lubrication space of the pumping unit of the fuel pump, wherein the support link of the first link of the link units is pivotally fixed to the mounting unit of the fuel pump.

The rotatable range of each link unit may be limited such that a free end of the last link unit in the link units connected in a series is positioned at the highest level in a fuel tank, with the mounting unit of the fuel pump being fixed to a fuel tank.

The open end of the vent tube may be connected to a free end of the support link of the last link unit in the link units connected in a series, a tube cap may connect the vent tube and the free end of the support link of the last link and having a vent hole fluid-communicating with the open end of the vent tube, and a guide cap may have a cap hole and be coupled to the tube cap to cover the tub cap, wherein the cap hole of the guide cap and the vent hole of the tube cap fluid-communicate with each other through a non-straight path while the guide cap covers the vent hole not to be exposed to the inside of the fuel tank through a straight path.

The link unit may include a first link unit and a second link unit, the first link unit includes a first support link that is pivotally fixed to a fixing hinge body fixed to the mounting unit of the fuel pump and a first spring that is an elastic member elastically supporting the first support link against the fixing hinge body, the fixing hinge body has a first stopper that restricts the maximum rotatable range of the first support link, the second link unit includes a second support link that is rotatably fixed to a float bracket formed to the end of the first support link and a second spring that is an elastic member elastically supporting the second support link against the float bracket, and the second support link has a second stopper that restricts the maximum rotatable range of the second support link with respect to the float bracket and tube cap and the guide cap are formed to a distal end of the second support link.

The vent tube may be made of a flexible material to be bendable by movement of the support links of the link unit, and the support link of the link unit may have a fixing portion to fix the vent tube thereto.

The fixing portion may be a hole formed in the support link.

The fuel pump may have the pumping unit sunk in the liquid fuel in the fuel tank and pumping up the fuel, and the mounting unit connected with the pumping unit, fixed to the fuel tank, and connected with the outside of the fuel tank while fixing the pumping unit with respect to the fuel tank, wherein the fixing hinge body is fixed to the mounting unit while protruding downward from the lower side of the mounting unit.

The present invention provides a structure that prevents liquid fuel in a fuel tank from flowing into a vent hole by positioning the vent hole communicating with a space, through which lubricant flows, for lubricating a pumping unit of a fuel pump to the highest level in the fuel tank, and makes it possible to easily mount the fuel pump having the vent hole in the fuel tank. Therefore, it is possible to prevent wear and noise of the fuel pump, improve durability, and simplify the installation work, thereby easily assembling the fuel pump.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is a view illustrating a lubricant vent structure of a fuel pump in a vehicle according to the present invention.

Figure 1:
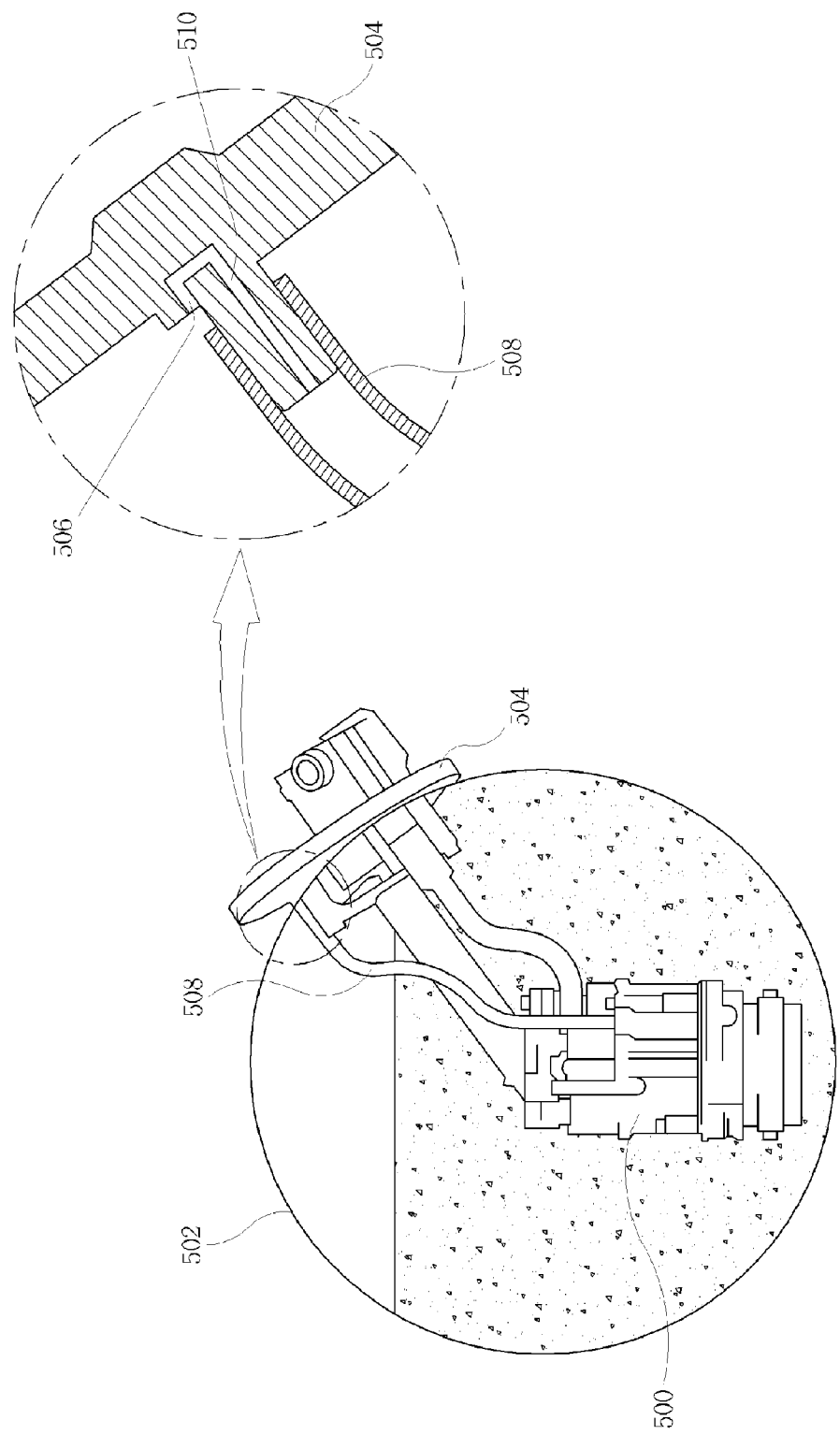
FIG. 1 shows an example when a fuel pump is mounted in a fuel tank which is used in LPI vehicles in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 3:
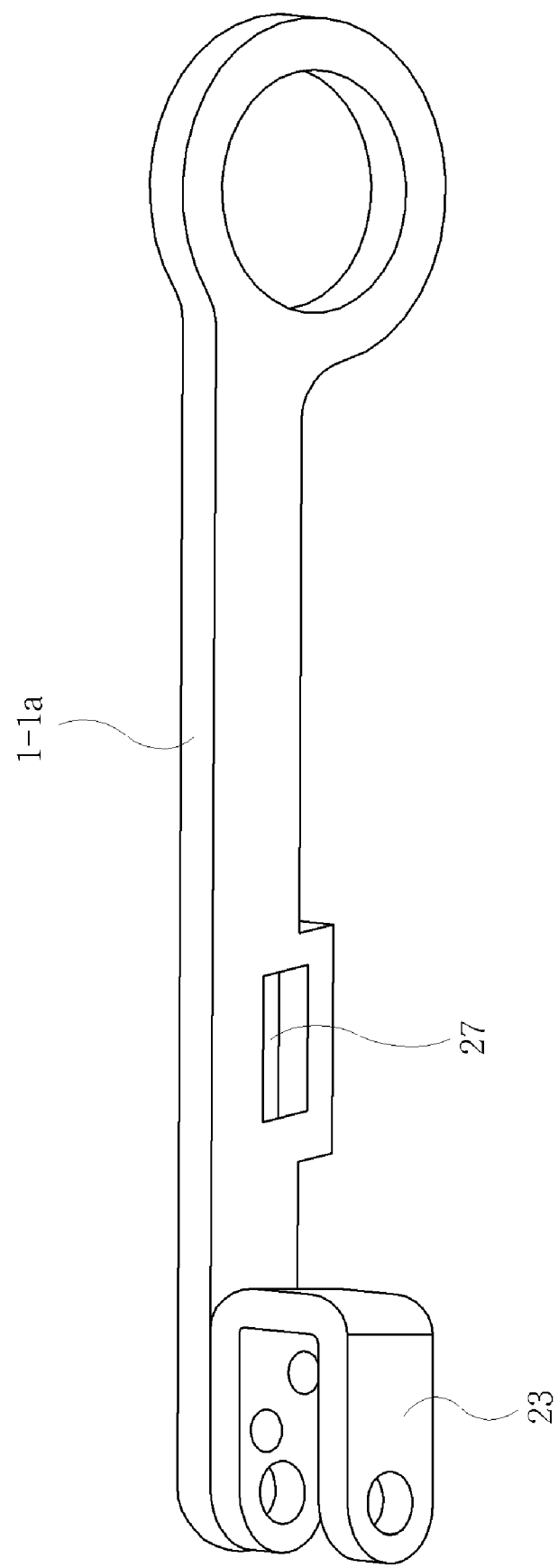
FIG. 3 is a view showing when a first support link and a float bracket of FIG. 1 are connected, seen from another angle.
Figure 4:
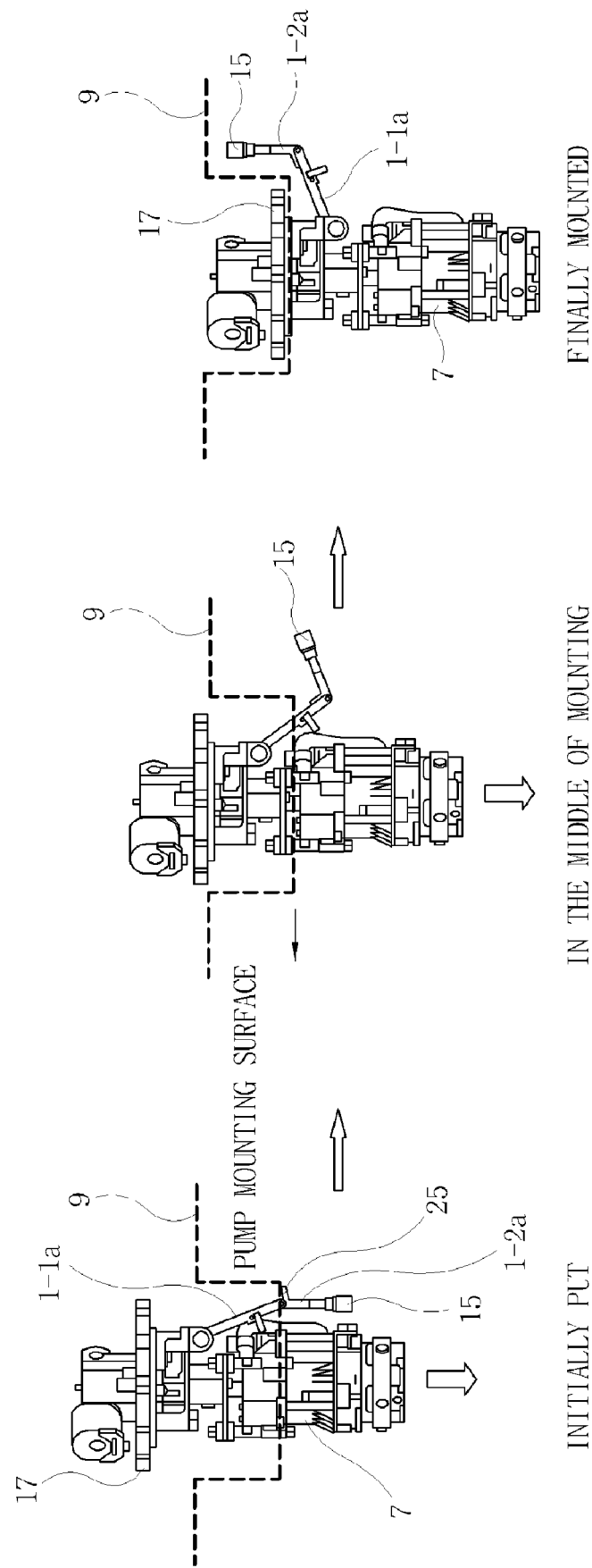
FIG. 4 is a view illustrating a process of mounting a fuel pump according to the present invention to a fuel tank.

Referring to FIGS. 2 to 4, an embodiment of the present invention includes at least one more of a link unit 1 having a support link fixed to restrict the rotatable range of a rotary shaft and an elastic member elastically supporting the support link in the direction of the maximum rotatable range, at least one more of the link units being connected in a series, a vent tube 3 communicating with a lubrication space of a pumping unit 7 of a fuel pump 5 and having an open end fixed to the support link of the link unit 1, and a rotary shaft fixing the support link of the first link unit of link units connected in series is fixed to the fuel pump 5.

The rotatable range of each link unit 1 is limited such that the free end of the last link unit 1 in link units 1 connected in a series is positioned at the highest level in fuel tank 9, with fuel pump 5 fixed to fuel tank 9.

That is, link units 1 are provided to keep the end of vent tube 3 at the highest position in fuel tank 9, and can be in close contact with fuel pump 5, as shown in FIG. 4, while fuel pump 5 is mounted in fuel tank 9, such that fuel pump 5 can be easily inserted into fuel tank 9. Further, after fuel pump 5 is inserted in fuel tank 9, link units 1 are rotated by the elastic member and the open end of vent tube 3 can be moved to the highest position in the fuel tank 9.

In the present embodiment, the open end of vent tube 3 is connected to the free end of the support link of the last link unit 1 in link units 1 connected in a series, a tube cap 13 having vent hole 11 communicating with the end of vent tube 3 is provided, and a guide cap 15 having a cap hole 18 covers tub cap 13 to communicate with the inside of fuel tank 9 through a non-straight path formed by the cap hole 18 and the vent hole 11 while covering vent hole 11 not to be exposed to the inside of fuel tank 9 through a straight path.

Therefore, it is possible to prevent the liquid fuel undulating in fuel tank 9 from directly flowing into vent hole 11, thereby more reducing possibility that the liquid fuel flows into vent hole 11.

Although several link units 1 can be connected in a series in accordance with the structure of fuel tank 9 or fuel pump 5, in the present embodiment, link unit 1 is composed of two link units, a first link unit 1-1 and second link unit 1-2 connected in a series.

First link unit 1-1 is composed of a first support link 1-1a that is rotatably fixed to a fixing hinge body 19 fixed to mounting unit 17 of fuel pump 5 and a first spring 1-1b that is an elastic member elastically supporting first support link 1-1a against fixing hinge body 19, in which fixing hinge body 19 has a first stopper 21 that restricts the maximum rotatable range of first support link 1-1a.

Second link unit 1-2 is composed of a second support link 1-2a that is rotatably fixed to float bracket 23 fixed to the end of first support link 1-1a and a second spring 1-2b that is an elastic member elastically supporting second support link 1-2a against float bracket 23, in which second support link 1-2a has a second stopper 25 that restricts the maximum rotatable range of second support link 1-2a with respect to float bracket 23.

Vent tube 3 is made of a flexible material to be easily bent by movement of support links of link unit 1 and the support link of link unit 1 has a fixing portion 27 to fix the middle portion of vent tube 3.

In the present embodiment, fixing portion 27 is a hole formed in first support link 1-1a such that vent tube 3 is wound and fixed by a strap 29.

Fuel pump 5 of the present embodiment includes, pumping unit 7 sunk in the liquid fuel in fuel tank 9 and pumping up the fuel, and mounting unit 17 connected with pumping unit 7, fixed to fuel tank 9, and connected with the outside of fuel tank 9 while fixing pumping unit 7 with respect to fuel tank 9, in which fixing hinge body 19 is fixed to mounting unit 17 while protruding downward from the lower side of mounting unit 17.

According to an embodiment of the present invention which has the configuration described above, when fuel pump 5 is mounted to fuel tank 9, as shown in FIG. 4, both of first support link 1-1a and second support link 1-2a can be developed downward in the longitudinal direction of fuel pump 5 in close contact with fuel pump 5 without protruding from fuel pump 5, such that it is possible to easily insert fuel pump 5 through a mounting hole for fuel pump 5 which is formed through fuel tank 9.

Further, a worker can hold first support link 1-1a and second support link 1-2a with hands and align first support link 1-1a and second support link 1-2a to be in close contact with fuel tank 5, against the elastic force of first support link 1-1a and second support link 1-2a, and can temporarily maintain this position, using a separate fixing band or a clip that is cut or removed in mounting fuel pump 5.

Once fuel pump 5 is inserted in fuel tank 9, first support link 1-1a and second support link 1-2a are rotated by first spring 1-1b and second spring 1-2b and stopped to the range restricted by first stopper 21 and second stopper 25, in which tube cap 13 and guide cap 15 connected with the end of vent tube 3 are positioned at the highest level in fuel tank 9.

Figure 5:
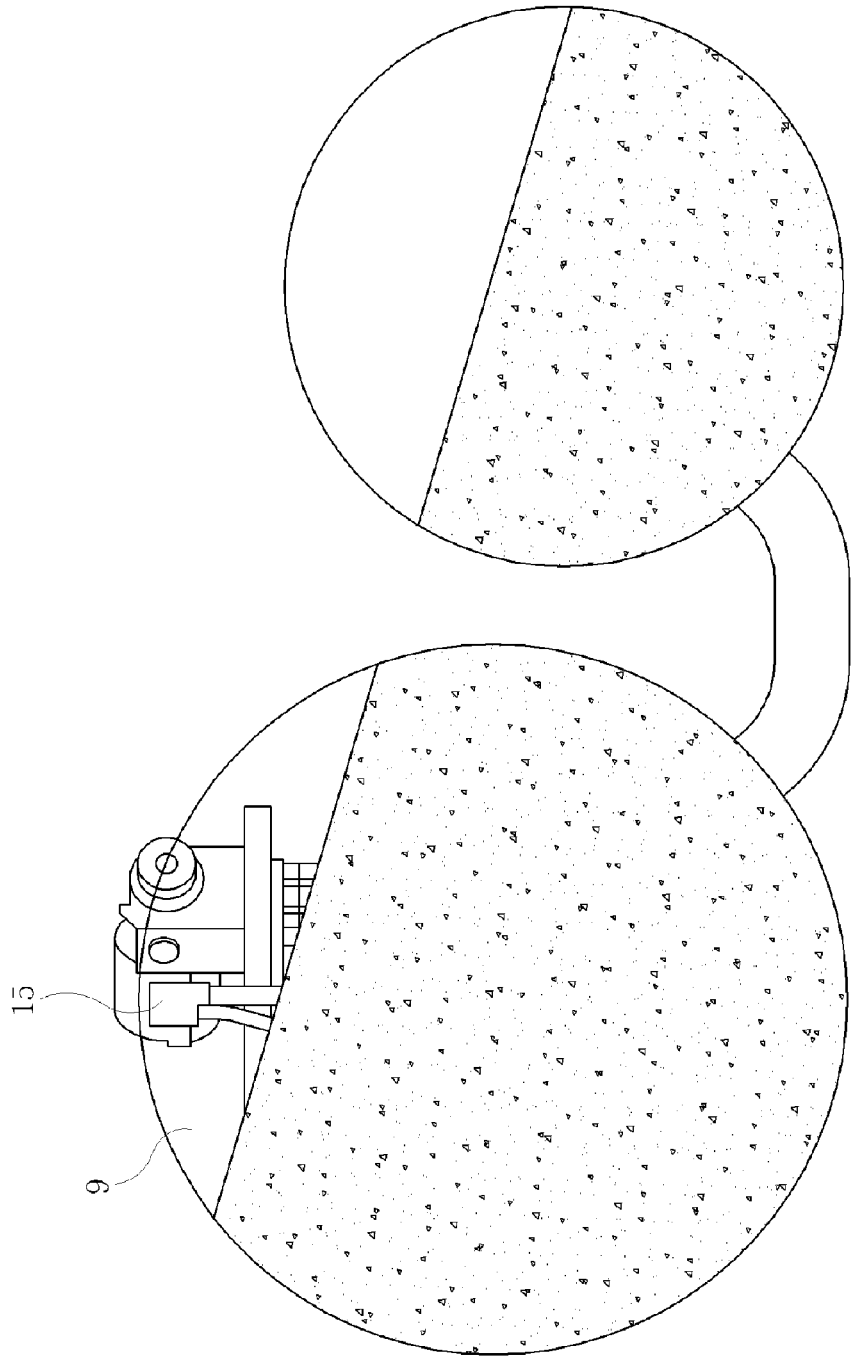
FIGS. 5 and 6 are views illustrating the operation of the lubricant vent structure of a fuel pump according to the present invention.
Figure 6:
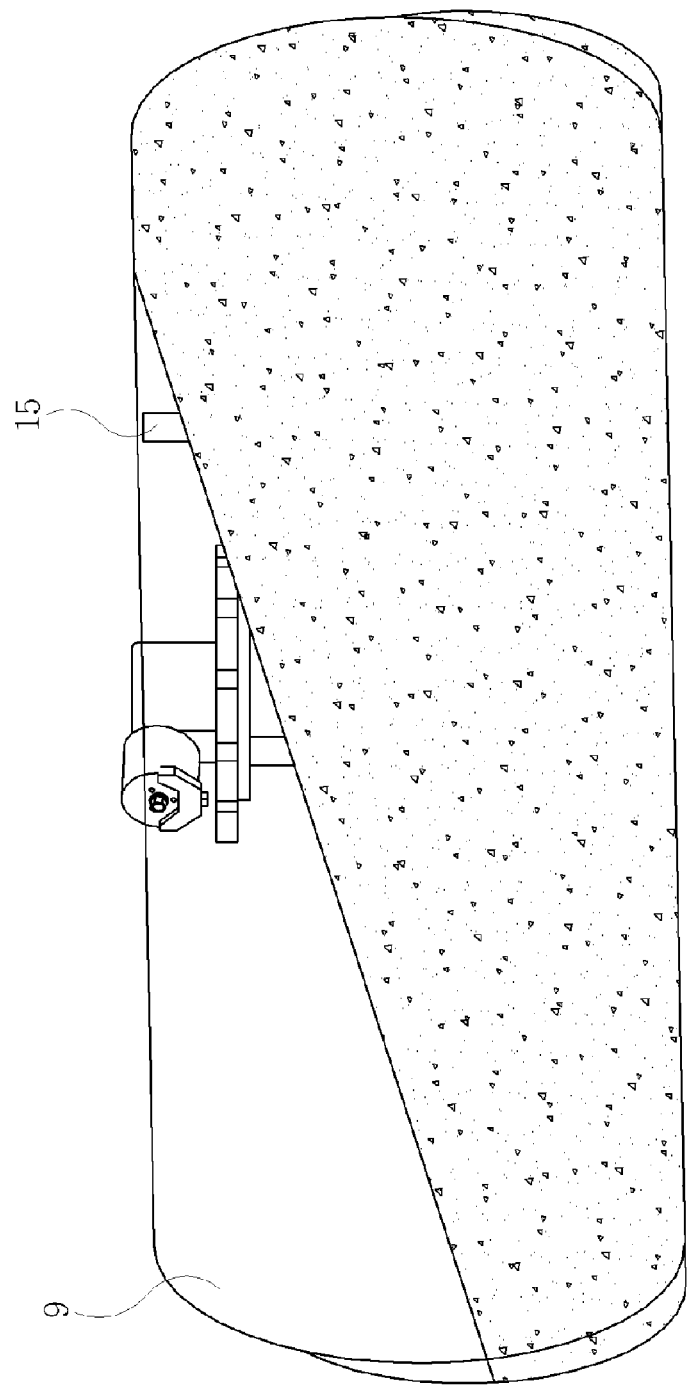

As described above, when guide cap 15 and tube cap 13 having vent hole 11 are positioned at the highest level in fuel tank 9, as shown in FIGS. 5 and 6, vent hole 11 is not sunk in the liquid fuel even at the maximum left-right inclination and front-rear inclination in design of the vehicle, with fuel tank 9 maximally filled with the fuel, such that the lubricant is prevented from being evaporated by the liquid fuel flowing into the lubrication space through vent hole 11.

Accordingly, it is possible to ensure stable lubrication of pumping unit 7 of fuel pump 5 and prevent wear and noise due to bad lubrication in fuel pump 5, such that durability of fuel pump 5 is considerably improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lubricant vent structure of a fuel pump for a vehicle, comprising:
    a mounting unit mounted to a pumping unit;
    a plurality of link units having a support link and a stopper restricting a rotatable range of the support link, wherein the plurality of link units is pivotally connected each other in a series by an elastic member respectively and the elastic member elastically supports the support link in the direction of the maximum rotatable range thereof; and
    a vent tube having an open end fixed to the last support link of the link units and communicating with a lubrication space of the pumping unit of the fuel pump,
    wherein the support link of the first link of the link units is pivotally fixed to the mounting unit of the fuel pump.

2. The lubricant vent structure of the fuel pump for the vehicle as defined in claim 1, wherein the rotatable range of each link unit is limited such that a free end of the last link unit in the link units connected in a series is positioned at the highest level in a fuel tank, with the mounting unit of the fuel pump being fixed to a fuel tank.

3. The lubricant vent structure of the fuel pump for the vehicle as defined in claim 2, wherein the open end of the vent tube is connected to a free end of the support link of the last link unit in the link units connected in a series,
    a tube cap connects the vent tube and the free end of the support link of the last link and having a vent hole fluid-communicating with the open end of the vent tube, and
    a guide cap has a cap hole and is coupled to the tube cap to cover the tub cap, wherein the cap hole of the guide cap and the vent hole of the tube cap fluid communicate with each other through a non-straight path while the guide cap covers the vent hole not to be exposed to the inside of the fuel tank through a straight path.

4. The lubricant vent structure of the fuel pump for the vehicle as defined in claim 3, wherein:
    the link unit includes a first link unit and a second link unit,
    the first link unit includes a first support link that is pivotally fixed to a fixing hinge body fixed to the mounting unit of the fuel pump and a first spring that is an elastic member elastically supporting the first support link against the fixing hinge body,
    the fixing hinge body has a first stopper that restricts the maximum rotatable range of the first support link,
    the second link unit includes a second support link that is rotatably fixed to a float bracket formed to the end of the first support link and a second spring that is an elastic member elastically supporting the second support link against the float bracket, and
    the second support link has a second stopper that restricts the maximum rotatable range of the second support link with respect to the float bracket and tube cap and the guide cap are formed to a distal end of the second support link.

5. The lubricant vent structure of the fuel pump for the vehicle as defined in claim 4, wherein the vent tube is made of a flexible material to be bendable by movement of the support links of the link unit, and
    the support link of the link unit has a fixing portion to fix the vent tube thereto.

6. The lubricant vent structure of the fuel pump for the vehicle as defined in claim 5, wherein the fixing portion is a hole formed in the support link.

7. The lubricant vent structure of the fuel pump for the vehicle as defined in claim 5, wherein the fuel pump has:
    the pumping unit sunk in the liquid fuel in the fuel tank and pumping up the fuel; and
    the mounting unit connected with the pumping unit, fixed to the fuel tank, and connected with the outside of the fuel tank while fixing the pumping unit with respect to the fuel tank,
    wherein the fixing hinge body is fixed to the mounting unit while protruding downward from the lower side of the mounting unit.

* * * * *